United States Patent
Kuranoshita

(12) 
(10) Patent No.: US 9,477,910 B2
(45) Date of Patent: Oct. 25, 2016

(54) IMAGE EDITING APPARATUS, IMAGE EDITING METHOD, AND NON-TRANSITORY STORAGE MEDIUM

(71) Applicant: FUJIFILM Corporation, Tokyo (JP)

(72) Inventor: Masashi Kuranoshita, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 168 days.

(21) Appl. No.: 14/549,657

(22) Filed: Nov. 21, 2014

(65) Prior Publication Data
US 2015/0147001 A1   May 28, 2015

(30) Foreign Application Priority Data

Nov. 25, 2013   (JP) .................................. 2013-242455

(51) Int. Cl.
G06K 9/36       (2006.01)
G06K 15/02      (2006.01)
G06T 11/60      (2006.01)

(52) U.S. Cl.
CPC .............. G06K 15/021 (2013.01); G06T 11/60 (2013.01)

(58) Field of Classification Search
None
See application file for complete search history.

(56) References Cited

U.S. PATENT DOCUMENTS

2005/0034067 A1*   2/2005   Inoue ..................... G06T 11/60
715/251

FOREIGN PATENT DOCUMENTS

| JP | 03-273253 A | 12/1991 |
| JP | 4-152474 A | 5/1992 |
| JP | 5-324777 A | 12/1993 |
| JP | 06-068211 A | 3/1994 |
| JP | 2013-026756 A | 2/2013 |

OTHER PUBLICATIONS

Rejection of the Application, dated Oct. 13, 2015, issued in corresponding JP Application No. 2013-242455, 12 pages in English and Japanese.
Notification of Reasons for Refusal, mailed Oct. 13, 2015, issued in corresponding JP Application No. 2013-242455, 11 pages in Japanese with complete machine translation in English.

* cited by examiner

*Primary Examiner* — Andrew Moyer
(74) *Attorney, Agent, or Firm* — Sughrue Mion, PLLC

(57) ABSTRACT

An imposing apparatus searches for a layout of objects whose profile shapes (profile lines) do not overlap each other with respect to each of cells that make up an imposition area. The imposing apparatus then adjusts an interval between the objects that have been laid out according to the search result, by a unit smaller than the unit length of the cells, thereby bringing the profile lines of adjacent ones of the objects into partial agreement with each other.

6 Claims, 19 Drawing Sheets

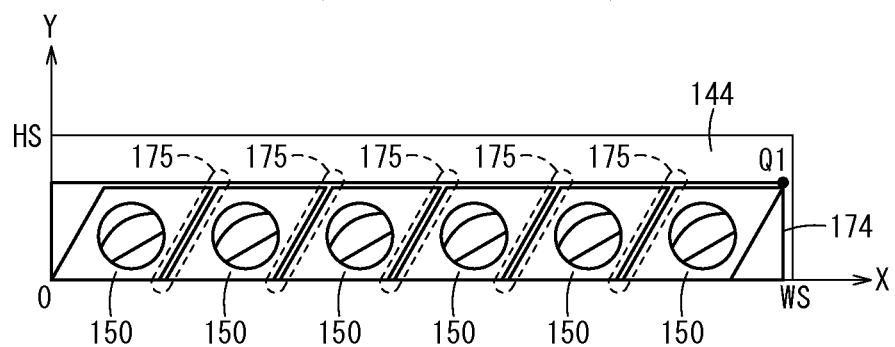
FIG. 12A (COMPARATIVE EXAMPLE)
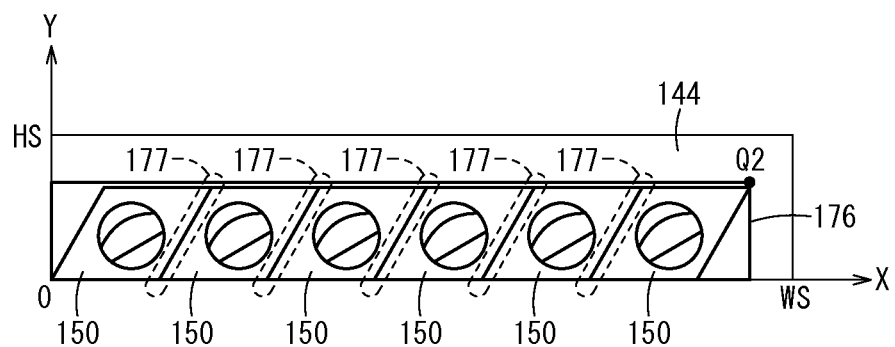
FIG. 12B

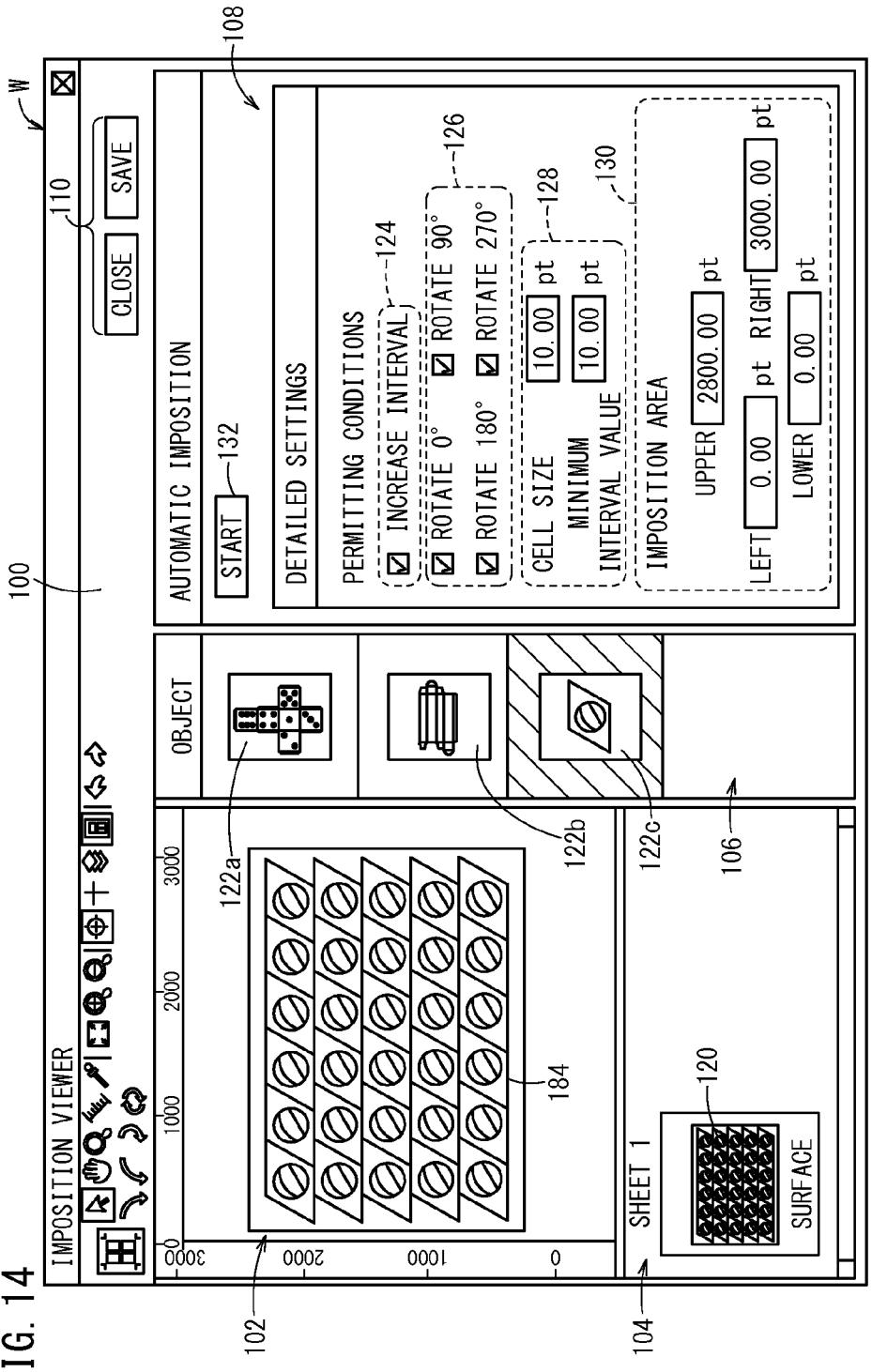

| GRADIENT | FIRST END POINT | SECOND END POINT | POINT OF INTERSECTION WITH X-AXIS | POINT OF INTERSECTION WITH Y-AXIS |
|---|---|---|---|---|
| 2.66666 | (19, 0.5) | (22, 8.5) | 18.8125 | -50.166 |
|  | (28, 0.5) | (31, 8.5) | 27.8125 | -74.166 |
| 0 | (19, 0.5) | (28, 0.5) | INF | 0.5 |
|  | (22, 8.5) | (31, 8.5) | INF | 8.5 |

| GRADIENT | FIRST END POINT | SECOND END POINT | POINT OF INTERSECTION WITH X-AXIS | POINT OF INTERSECTION WITH Y-AXIS |
|---|---|---|---|---|
| 2.66666 | (0.5, 0.5) | (3.5, 8.5) | 0.3125 | -0.8333 |
|  | (9.5, 0.5) | (12.5, 8.5) | 9.3125 | -24.8333 |
|  | (9.5, 0.5) | (12.5, 8.5) | 9.3125 | -24.8333 |
|  | (18.5, 0.5) | (21.5, 8.5) | 18.3125 | -48.8333 |
| 0 | (0.5, 0.5) | (9.5, 0.5) | INF | 0.5 |
|  | (3.5, 8.5) | (12.5, 8.5) | INF | 8.5 |
|  | (9.5, 0.5) | (18.5, 0.5) | INF | 0.5 |
|  | (12.5, 8.5) | (21.5, 8.5) | INF | 8.5 |

FIG. 18

| GRADIENT | FIRST END POINT | SECOND END POINT | POINT OF INTERSECTION WITH X-AXIS | DIFFERENCE | OVERLAP JUDGMENT |
|---|---|---|---|---|---|
| 2.66666 | (19, 0.5) | (22, 8.5) | 18.8125 | 0.000 | — |
| 2.66666 | (0.5, 0.5) | (3.5, 8.5) | 0.3125 | -18.500 | OK |
|  | (9.5, 0.5) | (12.5, 8.5) | 9.3125 | -9.500 | OK |
|  | (9.5, 0.5) | (12.5, 8.5) | 9.3125 | -9.500 | OK |
|  | (18.5, 0.5) | (21.5, 8.5) | 18.3125 | -0.500 | OK |

IMAGE EDITING APPARATUS, IMAGE EDITING METHOD, AND NON-TRANSITORY STORAGE MEDIUM

CROSS-REFERENCE TO RELATED APPLICATION

This application is based upon and claims the benefit of priority from Japanese Patent Application No. 2013-242455 filed on Nov. 25, 2013, the contents of which are incorporated herein by reference.

BACKGROUND OF THE INVENTION

1. Field of the Invention

The present invention relates to an image editing apparatus, an image editing method, and a non-transitory storage medium storing a program for ganging objects of one type in non-overlapping positions on a printing plate or a print medium.

2. Description of the Related Art

Heretofore, there has been known in the field of plate-making and printing a package printing process for ganging objects of a certain type, e.g., the development view of a package, on a single print medium (multiple imposition). Various techniques have been proposed in the art to lay out objects efficiently in non-overlapping positions.

Japanese Laid-Open Patent Publication No. 03-273253 discloses a method of and an apparatus for ganging desired images on a photosensitive medium with a step-and-repeat machine. The publication reveals, for example, that a plurality of basic layout patterns each comprising a combination of paired objects, e.g., six development patterns in the illustrated example, are placed complementarily.

According to Japanese Laid-Open Patent Publication No. 06-068211, there is proposed an apparatus for automatically determining an imposed layout in a sheet area by entering various items of information including figure data of objects. The publication states that the various items of information include a basic layout pattern, which defines combinations of figures according to several patterns, e.g., a pattern of two figure data, which are arranged respectively on upper and lower sides with the one being turned 180° with respect to the other.

SUMMARY OF THE INVENTION

Generally, the shapes of objects are designed by professionals such as designers in view of the efficiency with which to lay out the objects. Recently, the printing industry has seen an established environment which allows individuals, rather than professionals, to design objects with relative ease. Stated otherwise, the printers need to tackle the issue of how to gang objects that have been designed with almost no concern about the efficiency with which to lay out the objects.

However, the apparatus disclosed in the above publications have not taken into account the above problem, and do not guarantee that objects of any shapes can be laid out efficiently.

According to one solution, a known layout optimizing algorithm may be applied to place objects in a two-dimensional close-packed layout. However, the two-dimensional laying-out process requires a long processing time and tends to lower the efficiency of a cutting process in a case where the process produces an irregular object layout.

It is an object of the present invention to provide an image editing apparatus, an image editing method, and a non-transitory storage medium storing a program which are capable of efficiently ganging objects of any shapes in terms of a layout space, a processing time, and particularly a cutting process.

According to the present invention, there is provided an image editing apparatus for ganging objects of one type in non-overlapping positions on a printing plate or a print medium, including a profile shape acquirer for acquiring a profile shape of the objects, a layout condition setter for setting an imposition area on the printing plate or the print medium, and an object placer for laying out the objects in the imposition area set by the layout condition setter, based on the profile shape acquired by the profile shape acquirer, wherein the object placer includes a layout searcher for searching for a layout of the objects whose profile shapes do not overlap each other with respect to each of cells that make up the imposition area, and an interval adjuster for adjusting an interval between the objects that have been laid out according to a search result from the layout searcher, by a unit smaller than a unit length of the cells, thereby bringing profile lines of adjacent ones of the objects into partial agreement with each other.

The layout searcher searches for a layout of objects whose profile shapes do not overlap each other with respect to each of cells that make up the imposition area. Therefore, the amount of processing operation and the storage capacity of the memory required for the searching process are greatly reduced. In addition, the interval adjuster adjusts the interval between the objects that have been laid out according to the search result, by a unit smaller than the unit length of the cells, thereby bringing the profile lines of adjacent ones of the objects into partial agreement with each other. Consequently, regardless of the settings of the unit length of the cells, the profile lines of adjacent ones of the objects can partially be shared, and hence the objects can easily be separated in a single cutting stroke. Objects which may be of any shapes can therefore be ganged efficiently from the standpoints of a layout space, a processing time, and particularly the cutting process.

The interval adjuster should preferably express each of the profile shapes as a cluster of profile line segments, and adjust the interval between the objects such that ones of the profile line segments that have the same gradient overlap each other at least partially.

The object placer should preferably further include a cluster generator for generating an object cluster made up of two or more of the objects laid out along an arraying direction. The layout searcher should preferably regard the object cluster generated by the cluster generator as one set and search for a layout of the object clusters such that the profile shapes do not overlap each other, and the interval adjuster should preferably adjust the interval between the object clusters that have been laid out according to a search result from the layout searcher, thereby bringing the profile lines of adjacent ones of the objects into partial agreement with each other.

The layout searcher should preferably express the presence or absence of the objects by Boolean values with respect to the respective cells, and search for a layout of the objects while judging an overlap between the objects using a binary image represented by the Boolean values.

The object placer should preferably variably set a size of the cells in response to a predetermined input action.

According to the present invention, there is also provided an image editing method of ganging objects of one type in non-overlapping positions on a printing plate or a print medium, the image editing method enabling a computer to perform the steps of acquiring a profile shape of the objects, setting an imposition area on the printing plate or the print medium, and laying out the objects in the set imposition area based on the acquired profile shape, wherein the step of laying out the objects includes the steps of searching for a layout of the objects whose profile shapes do not overlap each other with respect to each of cells that make up the imposition area, and adjusting an interval between the objects that have been laid out according to a search result, by a unit smaller than a unit length of the cells, thereby bringing profile lines of adjacent ones of the objects into partial agreement with each other.

According to the present invention, there is also provided a non-transitory storage medium storing an image editing program for ganging objects of one type in non-overlapping positions on a printing plate or a print medium, the image editing program enabling a computer to perform the steps of acquiring a profile shape of the objects, setting an imposition area on the printing plate or the print medium, and laying out the objects in the set imposition area based on the acquired profile shape, wherein the step of laying out the objects includes the steps of searching for a layout of the objects whose profile shapes do not overlap each other with respect to each of cells that make up the imposition area, and adjusting an interval between the objects that have been laid out according to a search result, by a unit smaller than a unit length of the cells, thereby bringing profile lines of adjacent ones of the objects into partial agreement with each other.

According to the present invention, as described above, the image editing apparatus, the image editing method, and the storage medium search for a layout of objects whose profile shapes do not overlap each other with respect to each of cells that make up the imposition area. Therefore, the amount of processing operation and the storage capacity of the memory required for the searching process are greatly reduced. In addition, the image editing apparatus, the image editing method, and the storage medium adjust the interval between the objects that have been laid out according to the search result, by a unit smaller than the unit length of the cells, thereby bringing the profile lines of adjacent ones of the objects into partial agreement with each other. Consequently, regardless of the settings of the unit length of the cells, the profile lines of adjacent ones of the objects can partially be shared, and hence the objects can easily be separated in a single cutting stroke. Objects which may be of any shapes can therefore be ganged efficiently from the standpoints of a layout space, a processing time, and particularly the cutting process.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 12A is a view showing the positional relationship of laid-out objects placed in a close-packed layout along an X-axis;

FIG. 12B is a view showing the laid-out objects in FIG. 12A whose intervals have been adjusted;

FIG. 14 is a view showing a second image representing the setting screen for the automatic imposing process;

FIG. 18 is a diagram showing evaluation results in step S45 shown in FIG. 15.

DESCRIPTION OF THE PREFERRED EMBODIMENTS

An image editing method according to a preferred embodiment of the present invention in relation to an image editing apparatus for carrying out the image editing method and a non-transitory storage medium storing an image editing program will be described in detail below with reference to the accompanying drawings.

[Overall Arrangement of Print Production System 10]

Figure 1:
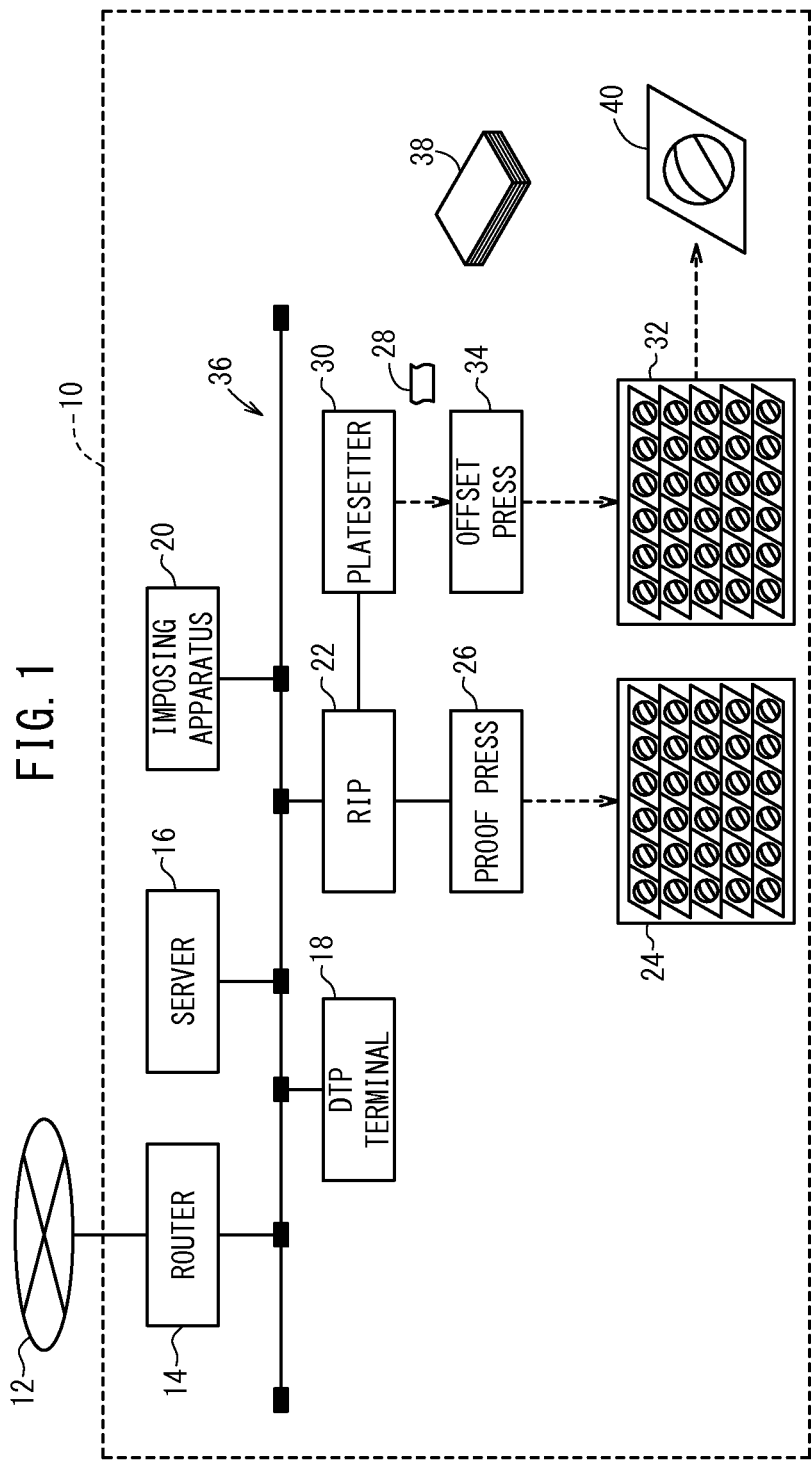
FIG. 1 is a block diagram of a print production system incorporating an imposing apparatus as an image editing apparatus according to an embodiment of the present invention.

FIG. 1 shows in block form a print production system 10 incorporating an imposing apparatus 20 as an image editing apparatus according to an embodiment of the present invention.

As shown in FIG. 1, the print production system 10 includes a router 14 serving as a device for connecting to a network 12, a server 16 which is accessible through the network 12 from terminal devices, not shown, belonging to external networks, a desktop publishing (DTP) terminal 18 for performing a DTP process, including an editing process, on contents data acquired from the server 16, etc., an imposing apparatus 20 for imposing contents data processed by the DTP terminal 18, a raster image processor (RIP) apparatus 22 for performing various image processing processes including a rasterizing process, a color conversion process, etc. based on platemaking data (or printing plate data) imposed by the imposing apparatus 20, a proof press 26 for printing a proof 24 based on processed proofread data sent from the RIP apparatus 22, a platesetter 30 for producing a printing plate 28 based on the platemaking data sent from the RIP apparatus 22, and an offset press 34 for producing a print 32 with the printing plate 28 set therein.

The server 16 is an apparatus that plays a central role in the workflow management in the print production system 10. The server 16 is connected to various terminal devices at least one of designers and production companies, not shown, for communication therewith through the router 14 and the network 12. The server 16 is also connected to the DTP terminal 18, the imposing apparatus 20, and the RIP apparatus 22 for communication therewith through a local area network (LAN) 36 constructed in the print production system 10.

Specifically, the server 16 is capable of performing a function as a file server for storing and transferring various data files, a function as an authorization management server for managing task authorizations that are available for terminals, users or print jobs, and a function as a mail server for generating and distributing notification mails at certain times such as process starting and ending times. The data files that can be managed by the server 16 as the file server include contents data, proof data, platemaking data, job ticket files {e.g., job definition format (JDF) files}, international color consortium (ICC) profiles, color sample data, etc.

The DTP terminal 18 performs a preflight process on contents data representing characters, figures, patterns, pictures, etc., and then generates image data per page (hereinafter also referred to as "page image") from the contents data thus processed. The imposing apparatus 20 performs an imposing process according to a binding process and a page folding process which have been designated, by referring to the tag information of a job ticket.

The RIP apparatus 22 functions as a printing processing server for at least one type of printing press. In FIG. 1, the RIP apparatus 22 is connected to the proof press 26 and the platesetter 30 for communication therewith. The RIP apparatus 22 converts data expressed in a page description language (PDL) (hereinafter referred to as "page description data") into print data suitable for output devices, and supplies the print data to the proof press 26 or the platesetter 30.

The proof press 26 prints a proof 24 based on the print data supplied from the RIP apparatus 22. The proof press 26 may comprise a direct digital color proofer (DDCP), an ink jet color proofer, a low-resolution color laser printer (electrophotographic printer), an ink jet printer, or the like.

The offset press 34 produces a print 32 which has images printed on a print medium 38 by applying inks to the main surface of the print medium 38 through printing plates 28 and intermediate transfer members, not shown. The offset press 34 may be replaced with a digital printing press for direct printing. The digital printing press may comprise an ink jet printing press, a wide-format printing press, an ink jet color proofer, a color laser printer (electrophotographic printer), or the like.

Thereafter, a number of stickers 40 (see FIG. 1) which are identical in shape to each other are separated from, e.g., blanked out of, the print 32.

Figure 2:
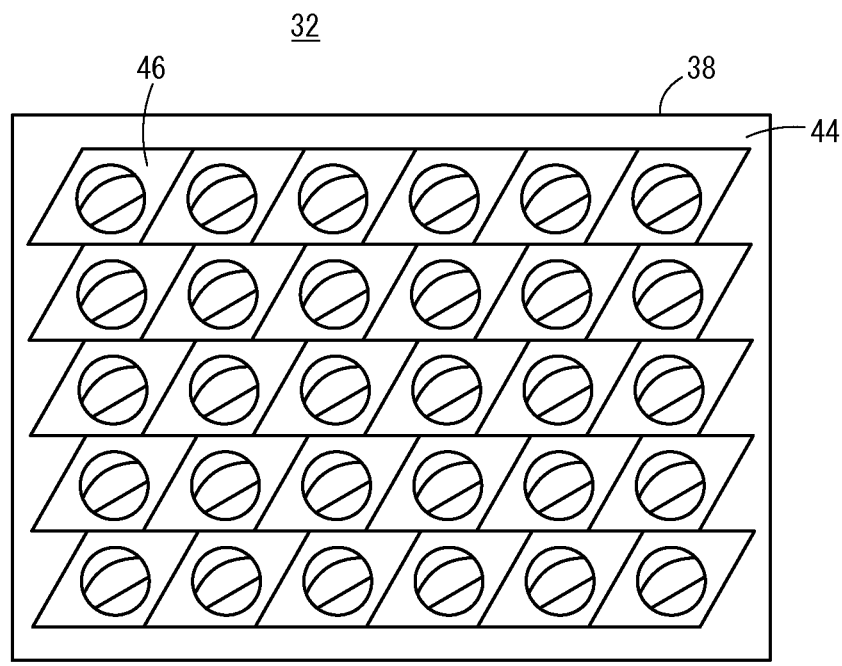
FIG. 2 is a front view of a print shown in FIG. 1.

FIG. 2 illustrates the print 32 shown in FIG. 1 in front elevation. As shown in FIG. 2, the print medium 38 has a printed surface 44 with many objects 46 of one type ganged thereon. The objects 46, which are equivalent to the stickers 40, are laid out in different positions and orientations in a highly packed or efficient layout. The objects 46 are disposed in a regular pattern, and hence can be highly efficiently cut out of the print 32. Since any adjacent two of the objects 46 have profile lines partially aligned with each other, they can be separated in a single cutting stroke.

The objects 46 are not limited to the stickers 40, but may be applied to any desired products such as packages, labels, seals, coasters, etc., for example.

[Electric Arrangement of the Imposing Apparatus 20]

Figure 3:
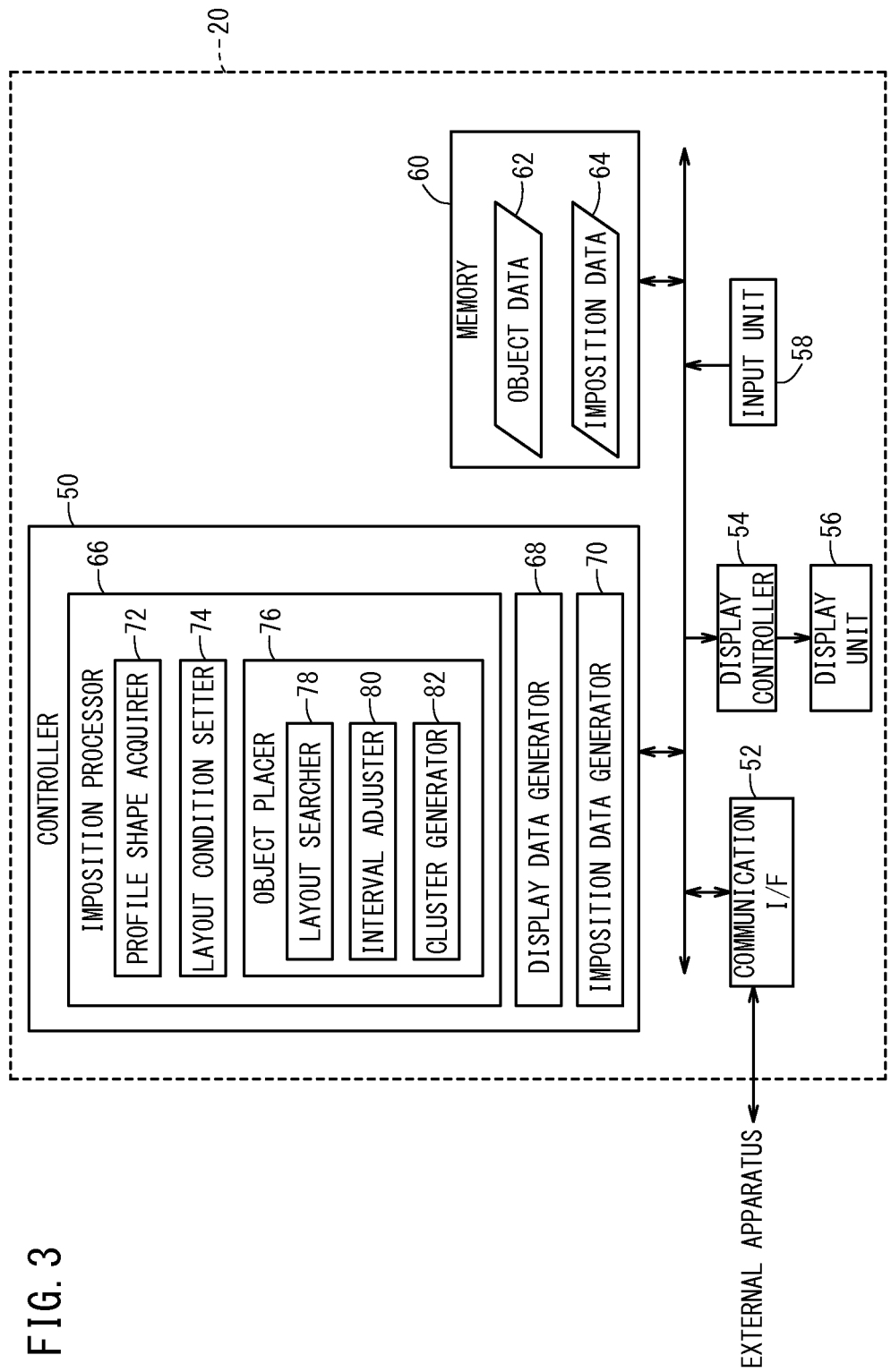
FIG. 3 is an electric block diagram of the imposing apparatus shown in FIG. 1.

FIG. 3 illustrates the imposing apparatus 20 shown in FIG. 1 in electric block form. As shown in FIG. 3, the imposing apparatus 20 comprises a computer having a controller 50, a communication interface (I/F) 52, a display controller 54, a display unit 56, an input unit 58, and a memory 60 (storage medium).

The communication I/F 52 is an interface (I/F) for sending electric signals to and receiving electric signals from external apparatus. The imposing apparatus 20 can acquire object data 62 from the server 16 (FIG. 1) through the communication I/F 52, and can supply imposition data 64 to the server 16 through the communication I/F 52.

The display controller 54 comprises a control circuit for controlling the display unit 56 under the control of the controller 50. Specifically, the display controller 54 outputs a display control signal via an I/F, not shown, to the display unit 56, whereby the display unit 56 is energized to display various images including windows W (see FIGS. 5 and 14).

The input unit 58 comprises various input devices including a mouse, a trackball, a keyboard, a touch sensor, etc. The display function of the display unit 56 and the input function of the input unit 58 are combined into a user interface.

The memory 60 stores programs, data, etc. which are required for the controller 50 to control various components. In FIG. 3, the memory 60 stores the object data 62 and the imposition data 64.

The memory 60 comprises a non-transitory, computer-readable storage medium. The computer-readable storage medium comprises a portable medium such as a magnetooptic disk, a ROM, a CD-ROM, a flash memory, or the like, or a storage medium such as a hard disk or the like incorporated in a computer system. The storage medium also includes a medium for dynamically holding programs for a short period of time, or a medium for holding programs for a certain period of time.

The controller 50 comprises a processor such as a central processing unit (CPU). The controller 50 reads and executes programs stored in the memory 60 to perform the functions of an imposition processor 66, a display data generator 68, and an imposition data generator 70.

The imposition processor 66 gangs objects 46 of one type in non-overlapping positions in a given area. Specifically, the imposition processor 66 has a profile shape acquirer 72 for acquiring the profile shape of the objects 46, a layout condition setter 74 for setting various conditions (hereinafter referred to as "layout conditions") about the layout of the objects 46, an object placer 76 for placing objects 46 sequentially according to predetermined layout rules. The object placer 76 has a layout searcher 78, an interval adjuster 80, and a cluster generator 82, as will be described later.

The display data generator 68 generates display data for displaying a window W (see FIG. 5, etc.) including a setting screen 100 on the display unit 56.

The imposition data generator 70 generates imposition data 64 representing imposition information for the objects 46 ganged by the imposition processor 66.

[Operation of Imposing Apparatus 20]

The imposing apparatus 20 as the image editing apparatus according to the present embodiment is constructed as described above. Operation of the imposing apparatus 20 shown in FIGS. 1 and 3 will be described in detail below with reference to a flowchart shown in FIG. 4.

<1. Overall Operation (Former Part)>

Figure 4:
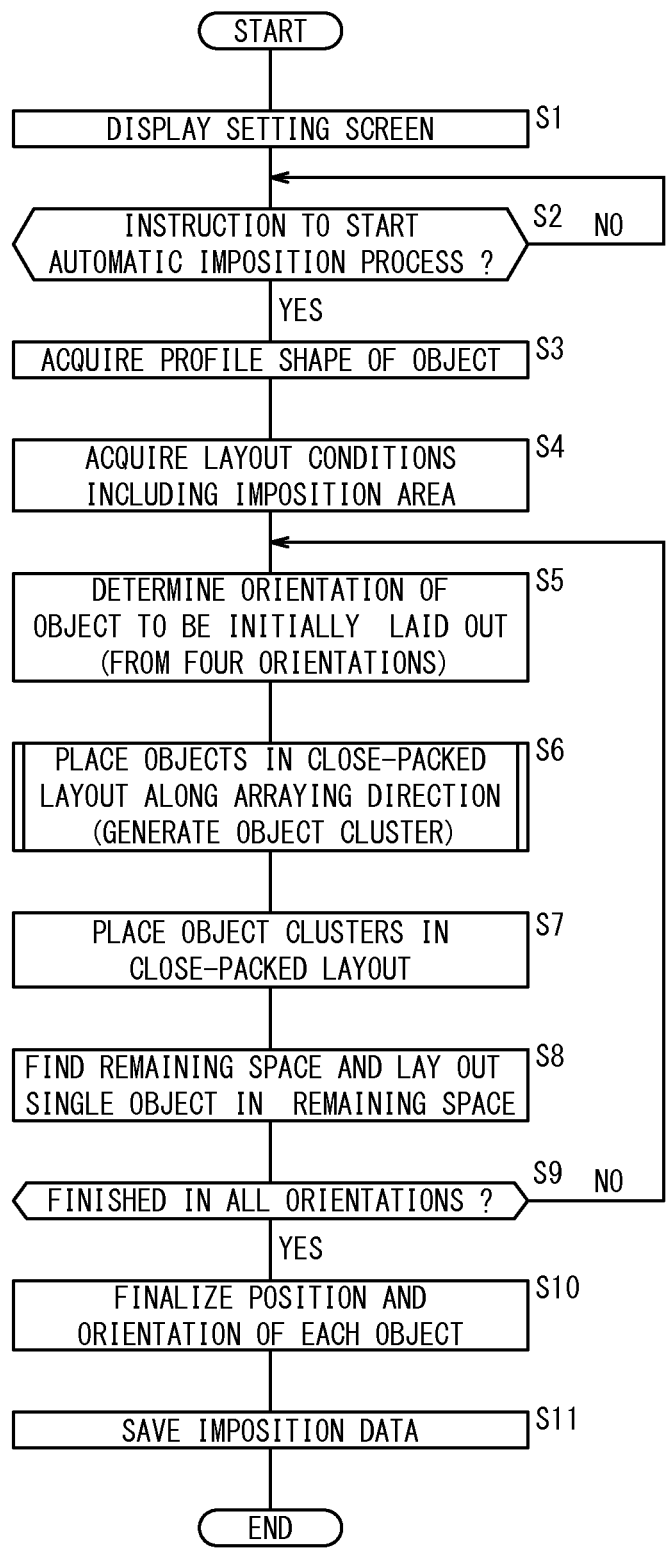
FIG. 4 is a flowchart of an operation sequence of the imposing apparatus shown in FIGS. 1 and 3.

In step S1 shown in FIG. 4, the imposing apparatus 20 displays a setting screen 100 (see FIG. 5) for use in making automatic imposition settings. Specifically, in response to an instruction to start making settings, the display data generator 68 generates display data for the setting screen 100, and then supplies the generated display data to the display controller 54. The display controller 54 controls the display unit 56 to display a window W including the setting screen 100.

Figure 5:
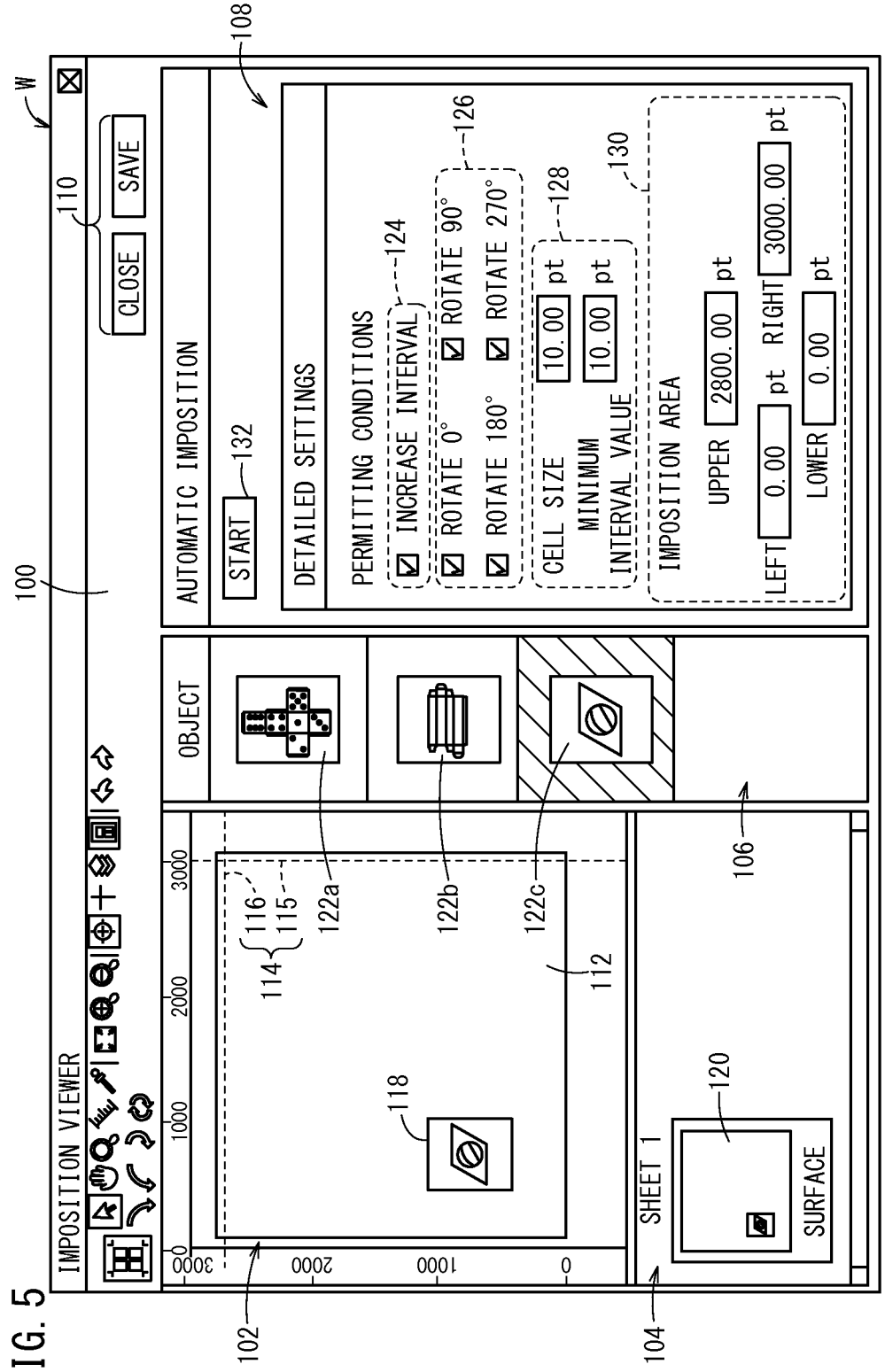
FIG. 5 is a view showing a first image representing a setting screen for an automatic imposing process.

As shown in FIG. 5, the setting screen 100 includes an imposition display field 102, a thumbnail display field 104, an object selection field 106, a condition setting field 108, and a button group 110 having buttons indicated as "CLOSE" and "SAVE". The user of the imposing apparatus 20, which will be also referred to as the operator, can operate the input unit 58 to make various settings mainly through the condition setting field 108.

The imposition display field 102 has a rectangular area 112 that simulates the shape of a printing plate 28 or a print medium 38, indication lines 114 including a vertical line 115 and a horizontal line 116 for indicating a rectangular imposition area 142 (FIG. 8), and a single scaled-down image 118.

The thumbnail display field 104 displays therein a thumbnail image 120 corresponding to the rectangular area 112. On the condition that there are a plurality of displayed thumbnail images 120, the operator may select one of the displayed thumbnail images 120 to call the imposed state of a corresponding sheet into the imposition display field 102.

The object selection field 106 displays scaled-down images 122a, 122b, 122c representing three objects. In FIG. 5, the scaled-down image 122c corresponding to the objects 46 shown in FIG. 2 is selected. The user selects an object 46 to be ganged by dragging the scaled-down image 122c and dropping it at any desired position in the rectangular area 112.

The condition setting field 108 has a check box 124, four check boxes 126, two text boxes 128, four text boxes 130, and a button 132 indicated as "START". The text boxes 130 are linked with the positions of the indication lines 114.

In step S2, the controller 50 judges whether an instruction to start an automatic imposing process has been entered or not. Specifically, the controller 50 judges whether it has received a click on the "START" button 132 in the condition setting field 108 (FIG. 5) or not. On the condition that the controller 50 has not received a click on the "START" button 132, step S2 is looped until the controller 50 receives a click on the "START" button 132. On the condition that the controller 50 has received a click on the "START" button 132, control goes to next step S3.

In step S3, the profile shape acquirer 72 acquires the profile shape of the object 46 to be ganged. Specifically, the profile shape acquirer 72 reads out object data 62 corresponding to the scaled-down image 118 (FIG. 5) from the memory 60, and thereafter acquires the profile shape of the object 46 to be ganged from the object data 62. The profile shape acquirer 72 may acquire the profile shape according to a process of acquiring ancillary information such as cutting data or the like or a known image processing process including a profile extracting process.

Figure 6:
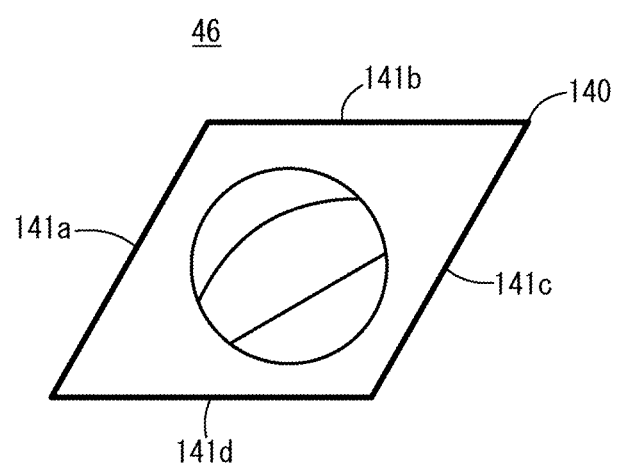
FIG. 6 is a view of an object to be ganged.

FIG. 6 schematically shows the object 46 to be ganged. The object 46 is shown as a rhombic sticker 40 with a logo being placed at its center. In FIG. 6, a profile line 140 represented by the bold line is extracted as the profile shape of the object 46. The profile line 140 is composed of four line segments 141a, 141b, 141c, 141d.

In step S4, the layout condition setter 74 acquires and sets layout conditions for the object 46 that have been entered in the setting screen 100. Specifically, the layout condition setter 74 acquires entered information from the condition setting field 108. As shown in FIG. 5, it is assumed that the layout condition setter 74 has acquired "PERMISSION" for "INCREASE INTERVAL" from the check box 124, and "PERMISSION" for "ROTATE 0°", "ROTATE 90°", "ROTATE 180°", "ROTATE 270°" from the check boxes 126. It is also assumed that the layout condition setter 74 has acquired "10.00", "10.00" (points, hereinafter referred to as "pt") from the text boxes 128, and "0.00, 0.00", "2800.00, 3000.00" (pt) from the text boxes 130.

Figure 8:
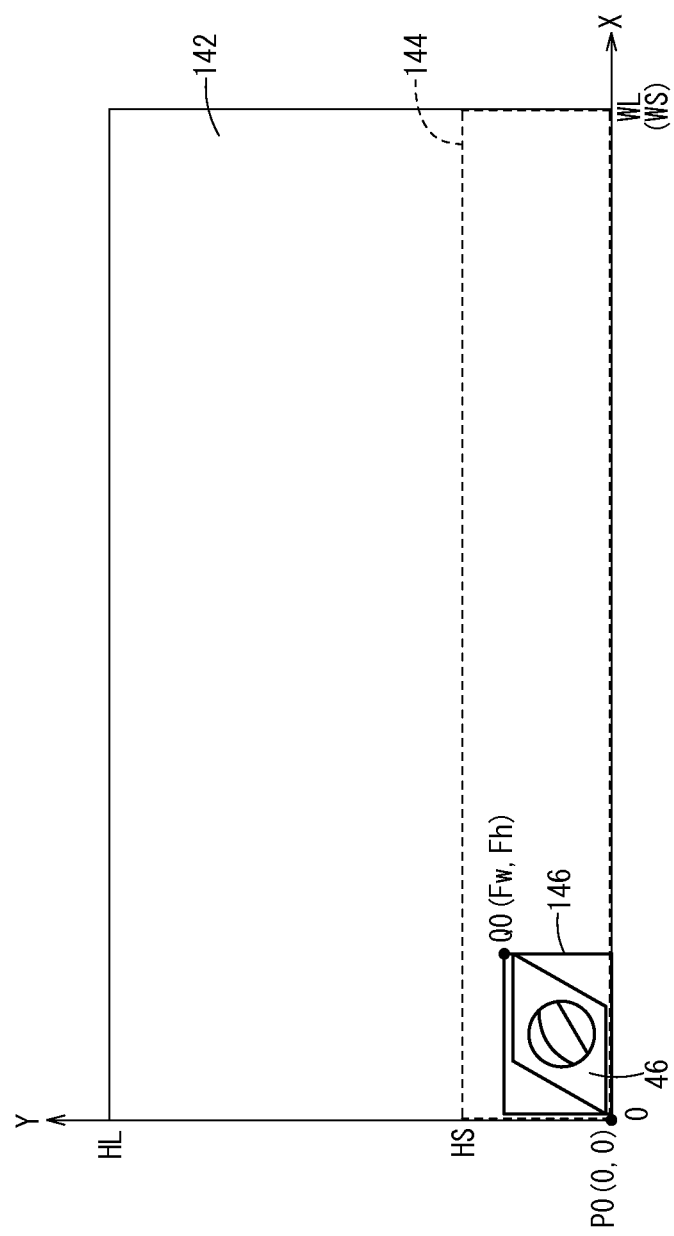
FIG. 8 is a view showing the positional relationship of an imposition area and a search area.

Whether the orientations, i.e., "ROTATE 0°" through "ROTATE 270°" should be permitted or not represent limiting conditions with respect to the orientation of the object 46. The numerical values "0.00, 0.00", "2800.00, 3000.00" represent coordinates for specifying the rectangular imposition area 142 (FIG. 8).

The layout condition setter 74 may automatically acquire layout conditions (including limiting conditions) for the object 46, as well as acquiring layout conditions that have manually been entered by the operator. For example, the layout condition setter 74 may determine whether to permit the object 46 to be rotated or not based on various items of information with respect to the grain direction of the print medium 38.

In step S5, the object placer 76 determines the orientation of an object 46 to be laid out first. As stated above, since the limiting conditions have been set to permit all the orientations "ROTATE 0°" through "ROTATE 270°", the object placer 76 can determine either one of these four orientations. It is assumed that the object placer 76 initially determines the orientation "ROTATE 0°".

<2. Detailed Operation of Layout Searcher 78>

In step S6, the object placer 76 generates an object cluster 180 (FIG. 13A) in which a greatest number of objects 46 are laid out along an arraying direction. A process of generating an object cluster 180 (step S6 in FIG. 4), mainly the operation of the layout searcher 78, will be described in detail below with reference to a flowchart shown in FIG. 7.

Figure 7:
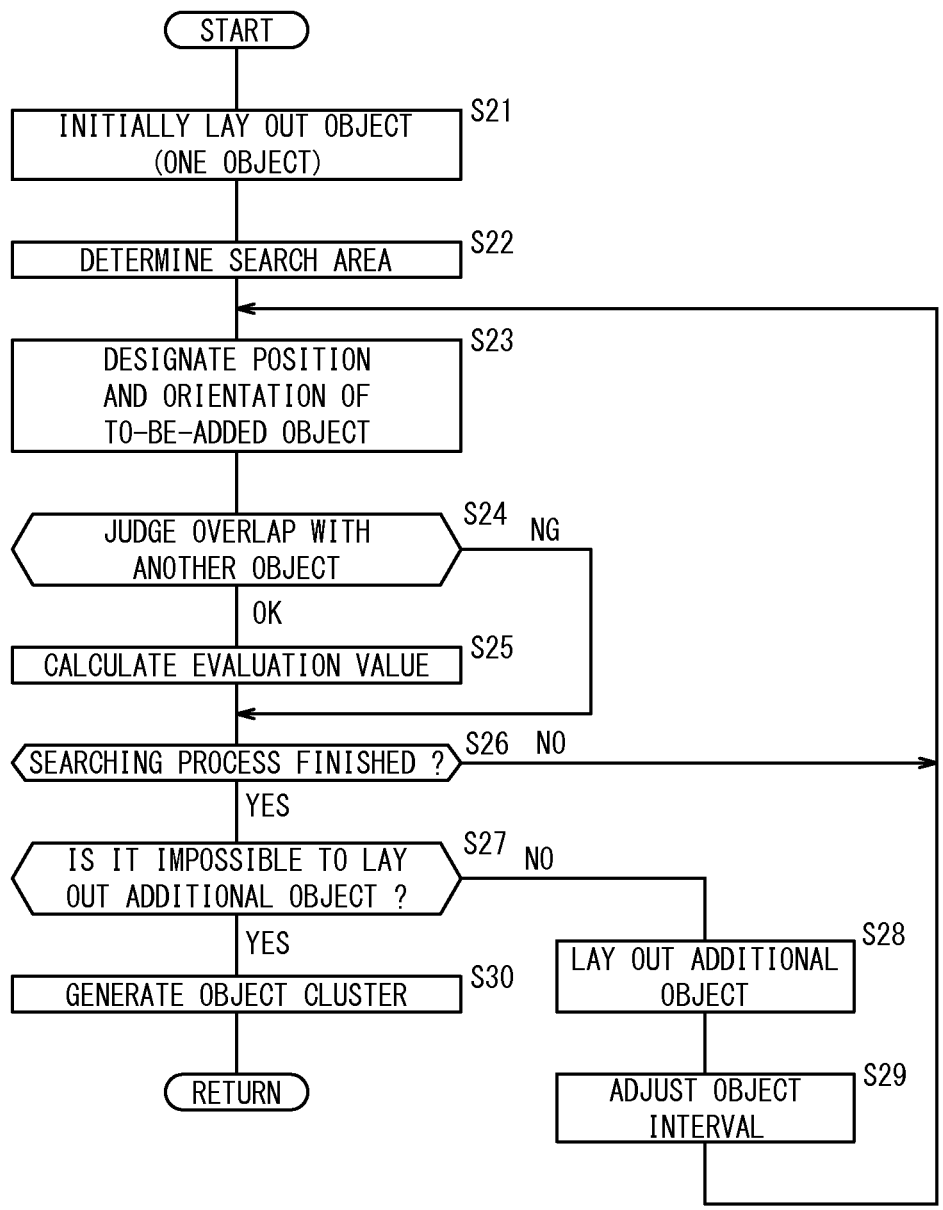
FIG. 7 is a detailed flowchart of a process of generating an object cluster (step S6 in FIG. 4)

In step S21 shown in FIG. 7, the layout searcher 78 initially lays out an object 46 in the orientation)(0° determined in step S5 shown in FIG. 4.

In step S22, the layout searcher 78 determines a search area 144, which is an area where objects 46 can be placed, in the rectangular imposition area 142 set in step S4 shown in FIG. 4.

FIG. 8 shows the positional relationship of the imposition area 142 and the search area 144. As shown in FIG. 8, the printing plate 28 or the print medium 38 has a lower left corner defined as an origin O (0, 0), has a longer direction defined as an X-axis and a shorter direction as a Y-axis. The imposition area 142 on the printing plate 28 or the print medium 38 represents a rectangular area having a side along the X-axis which is of a length WL=2800 pt and another side along the Y-axis which is of a length HL=3000 pt.

For example, in step S21, the object 46 is placed in reference to the origin O. Specifically, in a case where a rectangular frame circumscribing the object 46 is defined as a circumscribing frame 146, a lower left vertex of the circumscribing frame 146 is positioned in alignment with the origin O. The vertex which is closest to the origin O will hereinafter be referred to as "vertex P0", and the vertex of the circumscribing frame 146 which is farthest from the origin O as "vertex Q0". In FIG. 8, the vertex P0 has coordinates (0, 0) and the vertex Q0 has coordinates (Fw, Fh).

The layout searcher 78 determines a length WS of the search area 144 along the X-axis according to the expression (1) below and a length HS of the search area 144 along the Y-axis according to the expression (2) below.

$$WS=WL \quad (1)$$

$$HS=k \cdot Fh \quad (2)$$

where k is a positive real number that should preferably be generally kept in the range of 1<k<2.

Figure 9A:
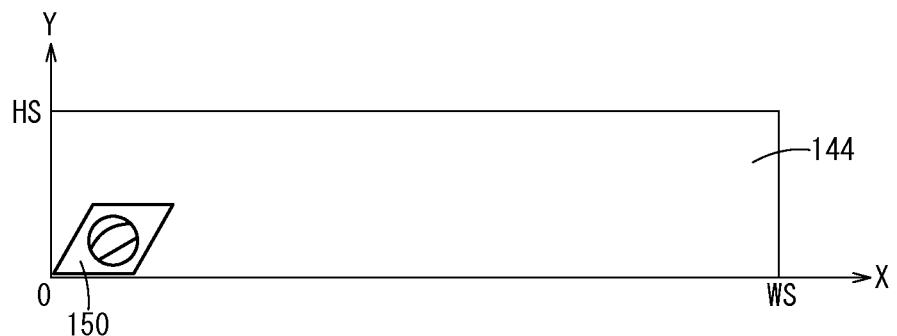
FIGS. 9A and 9B are views illustrating a process of searching for an object layout.

Then, the layout searcher 78 repeats steps S23 through S26, which will be described later, to sequentially place objects 46 whose positions and orientations have been determined, in the search area 144. For illustrative purposes, an object 46 which has been placed in the search area 144 will be referred to as a laid-out object 150 (see FIG. 9A).

In step S23, the layout searcher 78 designates the position and orientation of an object 46 to be added (hereinafter referred to as "to-be-added object 151").

Figure 9B:
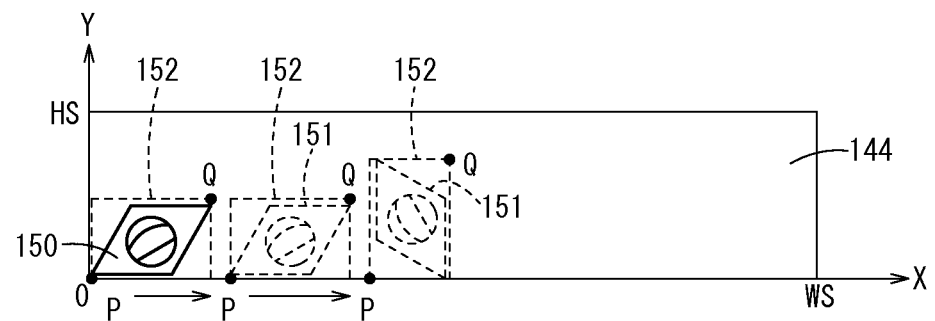

FIG. 9B shows a rectangular search frame 152 indicated by the broken lines which circumscribes the to-be-added object 151. The size of the search frame 152 is the same as the size of the circumscribing frame 146 (FIG. 8). The vertex of the search frame 152 which is closest to the origin O will hereinafter be referred to as "vertex P", and the vertex of the search frame 152 which is farthest from the origin O as "vertex Q". In subsequent steps, it is assumed that both the vertexes P, Q are positioned within the search area 144.

In step S24, the layout searcher 78 judges an overlap between the to-be-added object 151 whose position and orientation have been designated in step S23 and at least one laid-out object 150. According to the present embodiment, the layout searcher 78 uses a binary image that expresses the presence or absence of an object 46 (including a laid-out object 150 and a to-be-added object 151) to be laid out, by Boolean values with respect to respective cells C. Each of the cells C corresponds to a constituent unit of the imposition area 142, i.e., a minimum unit of sub-areas that constitute the imposition area 142.

Figure 10A:
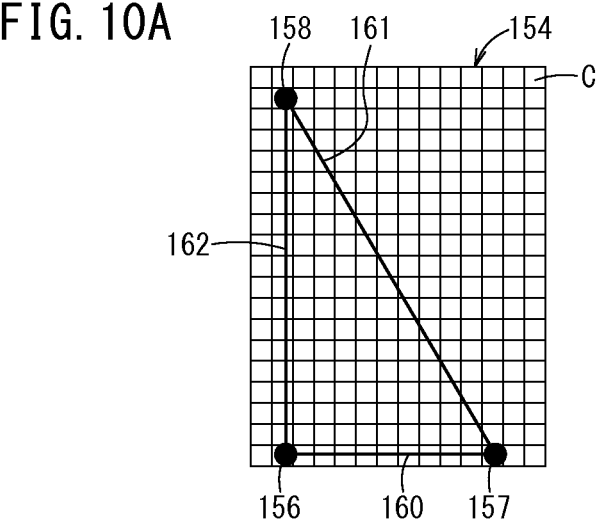
FIGS. 10A through 10C are views illustrating a process of rendering an object.
Figure 10B:
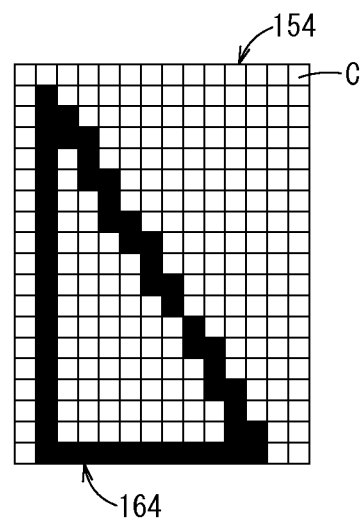
Figure 10C:
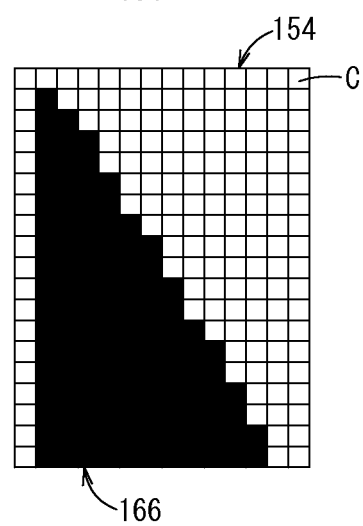

A specific process of rendering an object 46 will be described below with reference to FIGS. 10A through 10C. In FIGS. 10A through 10C, a working area 154 that simulates the search area 144 is introduced. The working area 154 is made up of a plurality of cells C into which the working area 154 is divided as mesh openings that are shown as square in shape. The size (hereinafter also referred to as "unit length") of each of the cells C is determined by an input value (10 pt in FIG. 5) that has been entered in one of the text boxes 128.

As shown in FIG. 10A, it is assumed that a triangular object, not shown, is placed in a position defined by three vertexes 156, 157, 158 in the working area 154. FIG. 10A shows, together with the three vertexes 156, 157, 158, a side 160 interconnecting the vertexes 156, 157, a side 161 interconnecting the vertexes 157, 158, and a side 162 interconnecting the vertexes 156, 158.

The presence or absence of the sides 160, 161, 162 is expressed by Boolean values assigned to respective cells C. Specifically, a value "TRUE (=1)" is assigned to each of the cells C where the sides 160, 161, 162 are present, and a value "FALSE (=0)" is assigned to each of the cells C where the sides 160, 161, 162 are not present. As a result, a pattern 164 is generated in the working area 154, as shown in FIG. 10B. Those cells C which are shown as filled indicate that their values are "TRUE", and those cells C which are shown as blank indicate that their values are "FALSE".

On the condition that there is a closed region surrounded by the cells C whose values are "TRUE", all the values of the cells C that are positioned within the closed region are replaced with the value "TRUE", thereby generating a pattern 166 in the working area 154, as shown in FIG. 10C. The pattern 164 shown in FIG. 10B represents the profile of an object, whereas the pattern 166 shown in FIG. 10C represents the image shape of the object.

Based on the binary image thus generated, the layout searcher 78 sequentially judges overlaps between objects. A specific process of judging an overlap between objects, which are assumed to be triangular in shape as is the case with the object shown in FIGS. 10A through 10C, will be described below with reference to FIGS. 11A and 11B.

Figure 11A:
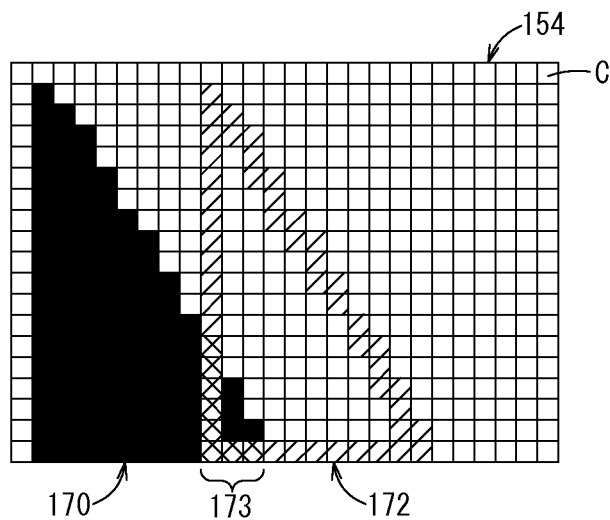
FIGS. 11A and 11B are views illustrating a process of judging an object overlap.
Figure 11B:
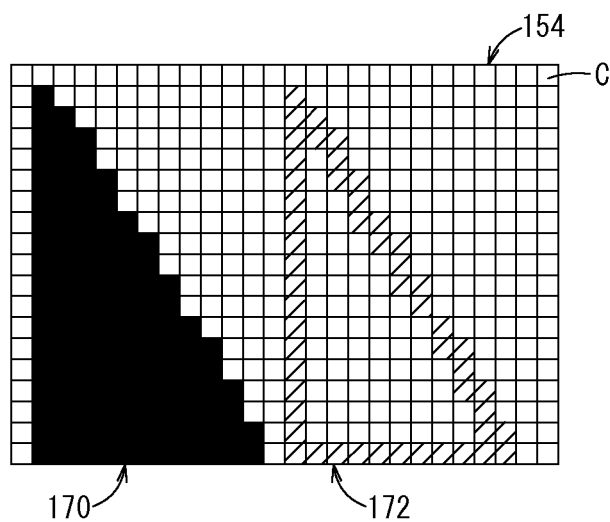

As shown in FIGS. 11A and 11B, a pattern 170, which is represented by a cluster of cells C shown as filled, corresponding to a laid-out object, is positioned in the working area 154. The layout searcher 78 generates a pattern 172, which is represented by a cluster of cells C shown as single-line-hatched, corresponding to a to-be-added object, and judges whether the pattern 172 overlaps the pattern 170 or not, with respect to each of the cells C of the pattern 172. Specifically, the layout searcher 78 judges "OK (CAN BE LAID OUT)" on the condition that the value of a cell C to be judged is "FALSE", and judges "N/A (CANNOT BE LAID OUT)" on the condition that the value of a cell C to be judged is "TRUE".

In FIG. 11A, since the patterns 170, 172 overlap each other in an overlapping range 173, which is represented by a cluster of cells C shown as cross-line-hatched, the layout searcher 78 judges that the to-be-added object cannot be laid out (N/A). In FIG. 11B, since the patterns 170, 172 do not overlap each other, the layout searcher 78 judges that the to-be-added object can be laid out (OK).

As the layout searcher 78 judges an overlap between the laid-out object 150 and the to-be-added object 151 with respect to each of the cells C as mesh openings of the imposition area 142, the amount of processing and the storage capacity of the memory required for the searching process are greatly reduced. The amount of processing required for the searching process is further reduced because at least one of the laid-out object 150 and the to-be-added object 151 is rendered as a pattern expressed by a profile shape in the working area 154.

The object may be of a more complex shape than the triangular shape described above. For processing such an object of complex shape, feature points, e.g., vertexes or inflection points, on the profile shape of the object are extracted, and adjacent ones of the feature points are interconnected by straight lines, thereby approximating the profile shape of the object. The judging process described above with reference to FIGS. 10A through 11B is applicable to the profile thus approximated.

The object placer 76 may variably set the size (actual dimensions) of a cell C in response to a predetermined input action. Specifically, the balance and priority of the processing accuracy and the processing time can be adjusted by appropriately setting the value of "CELL SIZE" in one of the text boxes 128 (FIG. 5). For example, the processing accuracy is increased in a case where the value of "CELL SIZE" is reduced, and the processing time is shortened in a case where the value of "CELL SIZE" is increased.

On the condition that the value of "MINIMUM INTERVAL" in the other one of the text boxes 128 (FIG. 5) is set to a value other than 0, an overlap can be judged strictly. In FIG. 5, since both the values of "CELL SIZE" and "MINIMUM INTERVAL" are 10 pt, the layout searcher 78 judges "OK" in step S24 on the condition that the interval between cells C is 1 (=minimum interval/cell size) or greater.

The layout searcher 78 judges an overlap between the to-be-added object 151 and at least one laid-out object 150 according to the above process. On the condition that the layout searcher 78 judges "N/A" (which is expressed as "NG" in FIG. 7) in step S24, control skips step S25 and jumps to step S26. On the condition that the layout searcher 78 judges "OK" in step S24, control goes to step S25.

In step S25, the layout searcher 78 calculates an evaluation value E with respect to the layout of the to-be-added object 151. Specifically, the layout searcher 78 calculates an evaluation value E according to the following expression (3):

$$E = x \cdot y \quad (3)$$

where x, y represent the coordinates of the vertex Q of the search frame 152.

As can be seen from the expression (3), the evaluation value E tends to be smaller on the condition that the vertex Q is closer to the origin O or closer to the X-axis or the Y-axis. The evaluation value E thus serves as an index for quantifying the extent to which objects are placed in a close-packed layout along the arraying direction.

The evaluation value E may be calculated using both of or either one of various parameters and evaluation functions, rather than according to the expression (3). The calculated evaluation value E is temporarily stored in the memory 60 in association with the position and orientation of the to-be-added object 151.

In step S26 shown in FIG. 7, the layout searcher 78 judges whether the searching process in the search area 144 has been finished or not. On the condition that the layout searcher 78 judges that the searching process has not been finished, control goes back to step S23 for the layout searcher 78 to repeat steps S23 through S26. Specifically, while successively changing both of or either one of the coordinates of the vertex P and the orientation of the search frame 152 in FIG. 9B, the layout searcher 78 judges [1] whether the search frame 152 falls within the search area 144 or not and judges [2] whether there is an overlap between the to-be-added object 151 and the laid-out object 150 or not. On the condition that the layout searcher 78 judges that the searching process in the search area 144 has been finished, control goes to next step S27.

In step S27, the layout searcher 78 judges whether it is impossible to lay out a to-be-added object 151 or not based on the result of the searching process. For example, the layout searcher 78 can judge whether it is impossible to lay out a to-be-added object 151 or not based on the number of times that step S25 is carried out, i.e., the evaluation value E is calculated, in the searching process. On the condition that step S25 has been carried out at least once, it is possible to lay out a to-be-added object 151 (step S27: NO), and control goes to next step S28.

In step S28, the layout searcher 78 selects a set of a position and an orientation whose evaluation value E is minimum from among at least one set of the position and the orientation temporarily stored in the memory 60, and adds and lays out one object 46.

In step S29, the interval adjuster 80 translates, as necessary, the to-be-added object 151 along the X-axis, thereby adjusting the interval between the to-be-added object 151 and the adjacent laid-out object 150. The interval adjusting process is carried out on the condition that the check box 124 (FIG. 5) is ticked off, and is not carried out on the condition that the check box 124 is not ticked off.

Thereafter, control goes back to step S23, for the layout searcher 78 to repeat steps S23 through S26 with one laid-out object 150 being added. As the layout searcher 78 successively lays out objects 46 along the arraying direction, i.e., along the X-axis in the embodiment, thereby incrementing the number of laid-out objects 150 one by one. Then, there may occur an instance where step S25 (the calculation of an evaluation value E) is not carried out even once during the searching process in steps S23 through S26.

In this case, in step S27, the layout searcher 78 now judges that it is impossible to lay out a to-be-added object 151 (step S27: YES), after which control goes to step S30.

In step S30, the cluster generator 82 generates an object cluster 180 based on the result of the searching process carried out by the layout searcher 78.

FIG. 12A is a view showing the positional relationship of laid-out objects 150 placed in a close-packed layout along the X-axis. In FIG. 12A, all of six objects 150 that have been laid out are regarded as one cluster, and a circumscribing frame 174 represents a rectangular frame circumscribing the cluster. Of the four vertexes of the circumscribing frame 174, the vertex that is farthest from the origin O is referred to as "vertex Q1".

As can be seen from FIG. 12A, the laid-out objects 150 are arranged in an array with their orientation remaining to be 0°. Therefore, the search area 144 contains a greatest number of laid-out objects 150 placed therein. On the condition that the interval adjusting process in step S29 is not carried out, slight clearances 175 are formed between adjacent ones of the laid-out objects 150.

It should be understood that the "close-packed layout" means an optimum solution achieved by the calculations according to a layout optimizing algorithm, and may not necessarily be in agreement with a theoretically exact solution.

FIG. 12B is a view showing the laid-out objects 150 in FIG. 12A with the intervals adjusted therebetween. In FIG. 12B, all of six objects 150 that have been laid out are regarded as one cluster, and a circumscribing frame 176 represents a rectangular frame circumscribing the cluster. Of the four vertexes of the circumscribing frame 176, the vertex that is farthest from the origin O is referred to as "vertex Q2".

As with FIG. 12A, the six laid-out objects 150 are arranged in an array with their orientation remaining to be 0°. However, inasmuch as the interval adjusting process in step S29 has been carried out, boundary areas 177 that partially share profile lines of the laid-out objects 150 are formed between adjacent ones of the laid-out objects 150. Stated otherwise, the vertex Q2 (FIG. 12B) is present at a position that is closer to the origin O than the vertex Q1 (FIG. 12A).

In this manner, the object placer 76 generates an object cluster 180 including a greatest number of objects 46 that are placed along the arraying direction (step S6 in FIGS. 4 and 7).

Figure 13A:
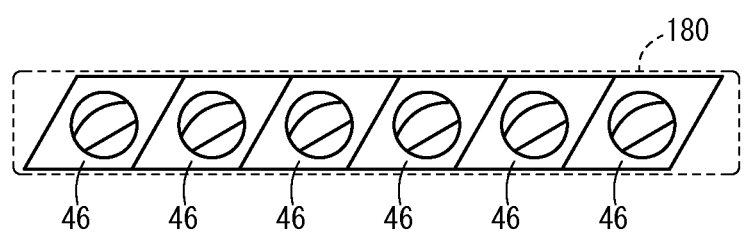
FIG. 13A is a front view of an object cluster.

FIG. 13A shows the object cluster 180 in front elevation. The object cluster 180 is identical to the cluster of laid-out objects 150 that is present in the circumscribing frame 176 (FIG. 12B). Specifically, the object cluster 180 is made up of a greatest number of objects 46 laid out along the arraying direction such that the length of the object cluster 180 does not exceed the length WL of one side of the imposition area 142 (FIG. 8).

<3. Overall Operation (Latter Part)>

Operation of the imposing apparatus 20 shown in FIGS. 1 and 3 will be described in detail with reference to the flowchart shown in FIG. 4.

In step S7 shown in FIG. 4, the layout searcher 78 regards the object cluster 180 (FIG. 13A) generated in step S6 as one set and searches for a layout of the object clusters 180 such that profile lines 140 do not overlap each other. The searching process may be the same as the process of searching for the layout of a single object 46 (see FIGS. 8 through 9B). Furthermore, the overlap judging process may be the same of the process of making a judgment about an overlap for a single object 46 (see FIGS. 10A through 11B).

Specific details of operation of the layout searcher 78 will be described below with reference to FIG. 13B. The imposition area 142 is established in its entirety as the search area 144.

The layout searcher 78 initially places the object cluster 180 in reference to the origin O. Then, the layout searcher 78 successively searches for the layouts of the object clusters 180 while judging an overlap between the object clusters 180.

Figure 13B:
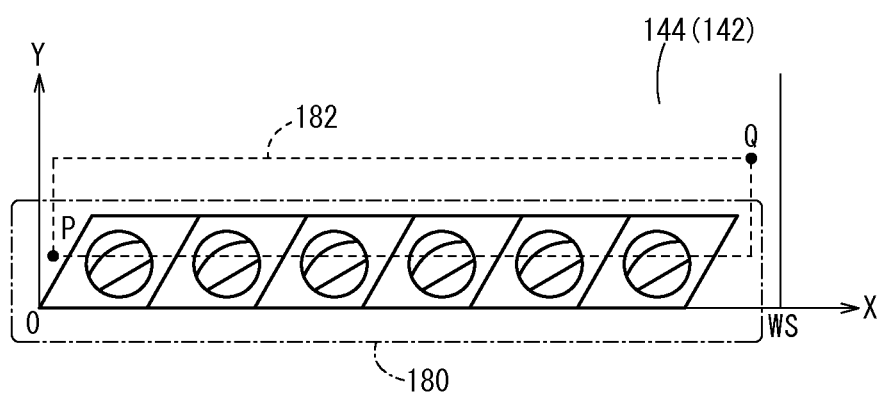
FIG. 13B is a view illustrating a process of searching for the layout of an object cluster.

As shown FIG. 13B, the object placer 76 searches for the layouts of the object clusters 180 while designating the position and orientation of an object cluster 180 to be added. The position of the object cluster 180 is designated using a rectangular search frame 182 that circumscribes the object cluster 180. The orientation of the object cluster 180 is either 0° or 180°. The object placer 76 then determines one set of a position and an orientation whose evaluation value E according to the expression (3) is minimum, in the same manner as with step S6 in FIG. 4.

Thereafter, the layout searcher 78 similarly lays out as many object clusters 180 as possible in the imposition area 142 as the search area 144 (step S7). The interval adjuster 80 adjusts the intervals between the object clusters 180 that have been laid out according to the result of the searching process, thereby bringing the profile lines 140 of adjacent ones of the objects 46 into partial agreement with each other.

In step S8, the layout searcher 78 finds a remaining space in the imposition area 142 after the object clusters 180 have already been laid out in step S7, and then lays out as many objects 46 as possible in the remaining space.

In step S9, the object placer 76 judges whether layout trials for all orientations have been finished with respect to the object 46 to be initially laid out or not. On the condition that the object placer 76 judges that the layout trials for all orientations have not been finished, control goes back to step S5 in which an unselected orientation, i.e., one of 90°, 180°, and 270°, is selected, and then steps S5 through S9 are repeated. On the condition that the object placer 76 judges that the layout trials for all orientations have been finished, control goes to next step S10.

In step S10, the imposition processor 66 finalizes the position and orientation of each object 46 based on the processing results in step S3 through S9. The layout results for the objects 46 have been obtained with respect to each of the four orientations for initial layouts. For example, the imposition processor 66 may select one of the layout results based on the total number of layouts, the evaluation results E, or the priority of orientations of the objects 46, thereby finalizing the position and orientation of each object 46.

Thereafter, the imposing apparatus 20 updates the setting screen 100 displayed for making automatic imposition settings. In a case where the position and orientation of each object 46 is finalized, the display data generator 68 updates the display data for the setting screen 100 and then supplies the updated display data to the display controller 54. The display controller 54 controls the display unit 56 to display a window W including the setting screen 100.

The setting screen 100 shown in FIG. 14 is different from the setting screen 100 shown in FIG. 5 as to the display format of the imposition display field 102. Specifically, the imposition display field 102 has an image area 184 that simulates a ganged object pattern on the printing plate 28 or the print medium 38, instead of the rectangular area 112. The operator visually checks the ganged object pattern presented in the image area 184 to determine whether the ganged object pattern is acceptable or not. In response to the operator clicking on the "SAVE" button in the button group 110 on the setting screen 100, control goes to next step S11 shown in FIG. 4.

In step S11, the imposition data generator 70 generates imposition data 64 representing imposition information that specifies the position and orientation of each object 46 that is finalized in step S10, and then stores and saves the imposition data 64 in the memory 60. Thereafter, the imposing apparatus 20 may send the imposition data 64 through the communication I/F 52 to an external apparatus, e.g., the server 16, in order to save the imposition data 64 in the server 16.

<4. Detailed Operation of Interval Adjuster 80>

In a case where an overlap judgment is made using cells C, the resulting layout of objects 46 depends on the unit length of the cells C. For example, as the unit length of the cells C is greater, the positional resolution is lower, so that an overlap judgment tends to become stricter. As a result, the intervals between the objects 46 become non-negligibly greater, so that the required number of times of cutting for separating the objects 46 from one another is increased. Such a process is tedious and time-consuming for the operator.

According to the present embodiment, there is proposed a ganging process for efficiently separating objects 46. Operation of the interval adjuster 80 will be described in detail below with reference to a flowchart shown in FIG. 15 and also FIGS. 16 through 19.

Figure 15:
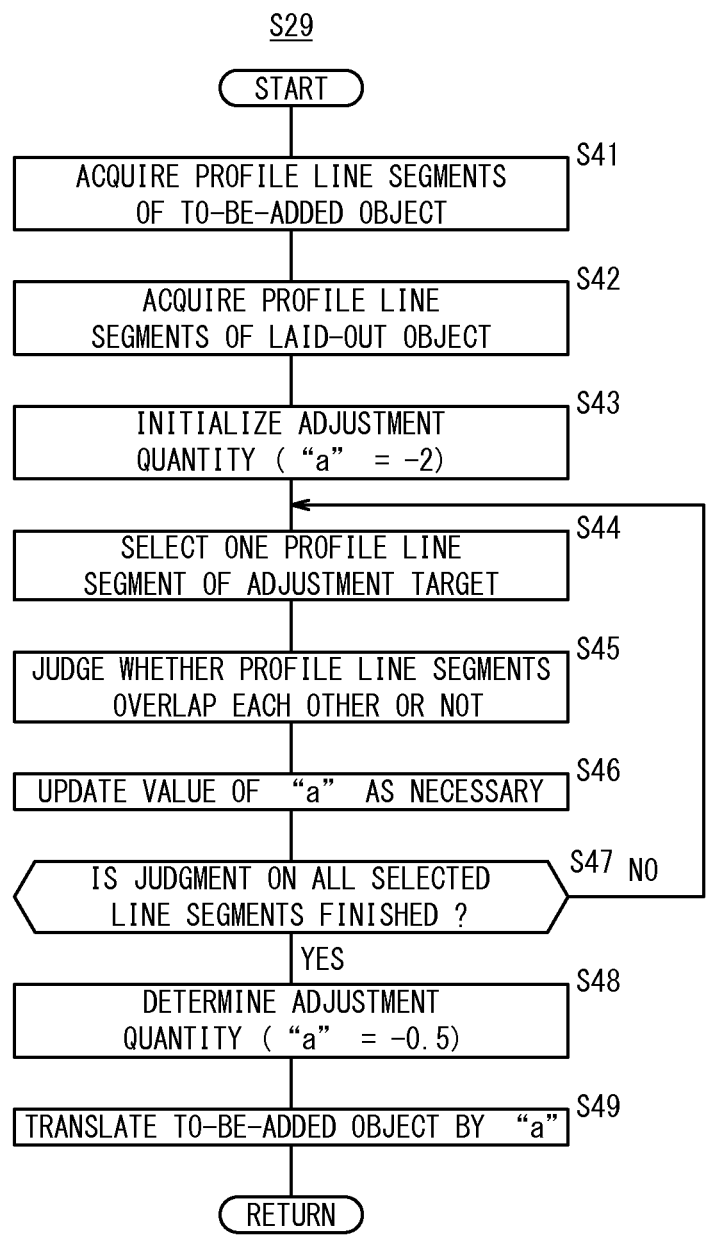
FIG. 15 is a detailed flowchart of a process of adjusting intervals between objects (step S29 in FIG. 7)
Figure 16:
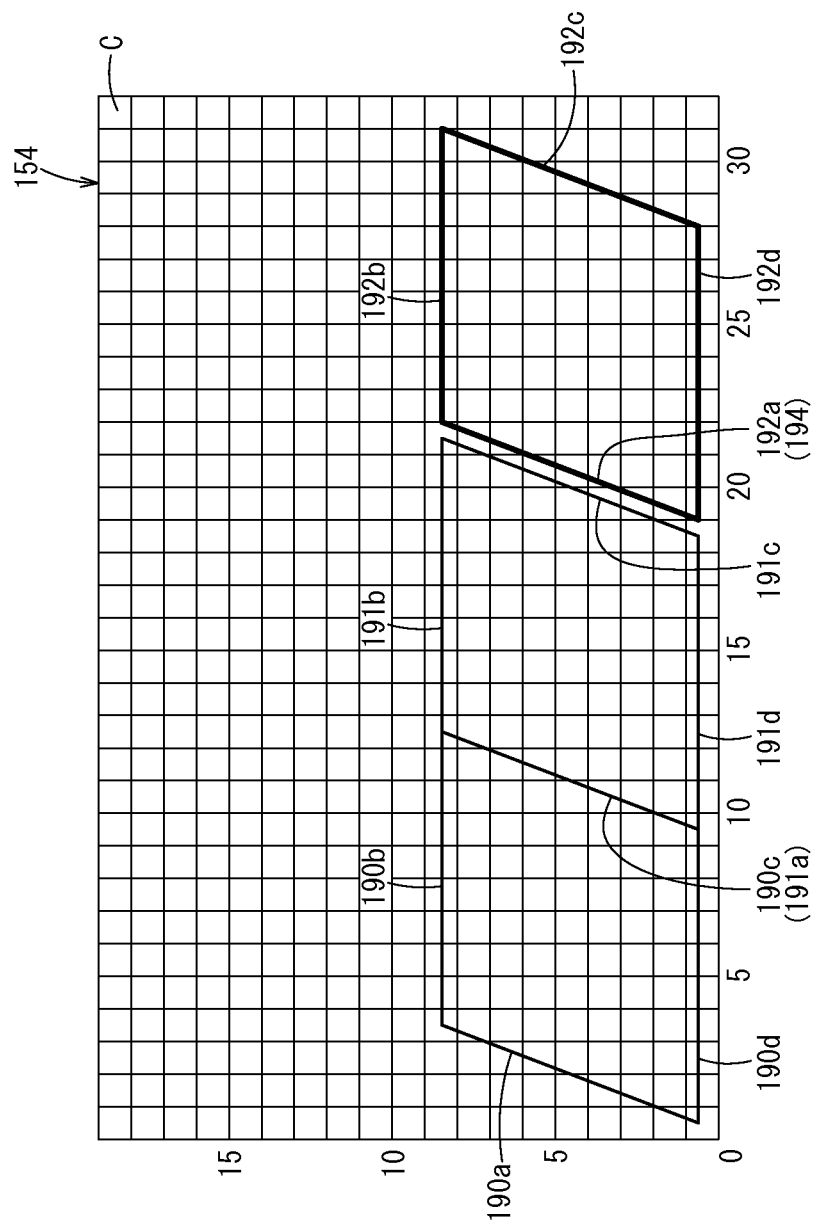
FIG. 16 is a view showing the positional relationship between a laid-out object and a to-be-added object.

In step S41 shown in FIG. 15, the interval adjuster 80 acquires the positional information of a plurality of profile line segments 192a through 192d based on the position and shape of one to-be-added object 151 (FIG. 16).

In step S42, the interval adjuster 80 acquires the positional information of a plurality of profile line segments 190a through 190d, 191a through 191d based on the position and shape of at least one laid-out object 150.

FIG. 16 is a view showing the positional relationship between the laid-out object 150 and the to-be-added object 151. As with FIG. 10A, etc., a working area 154 is divided into a plurality of cells C as mesh openings. Numbers shown around the working area 154 represent graduations based on the size (unit length) of the cells C.

The four profile line segments 190a through 190d make up the profile line 140 (FIG. 6) of the laid-out object 150 which has been laid out first. Specifically, the profile line segment 190a corresponds to the line segment 141a, the profile line segment 190b to the line segment 141b, the profile line segment 190c to the line segment 141c, and the profile line segment 190d to the line segment 141d.

The four profile line segments 191a through 191d make up the profile line 140 (FIG. 6) of the laid-out object 150 which has been laid out second. Specifically, the profile line segment 191a corresponds to the line segment 141a, the profile line segment 191b to the line segment 141b, the profile line segment 191c to the line segment 141c, and the profile line segment 191d to the line segment 141d.

The four profile line segments 192a through 192d make up the profile line 140 (FIG. 6) of the to-be-added object 151. Specifically, the profile line segment 192a corresponds to the line segment 141a, the profile line segment 192b to the line segment 141b, the profile line segment 192c to the line segment 141c, and the profile line segment 192d to the line segment 141d.

Figures 17A, 17B:
FIG. 17A is a diagram showing the positional information of profile line segments of the to-be-added object.
FIG. 17B is a diagram showing the positional information of profile line segments of two laid-out objects.

FIG. 17A is a diagram showing the positional information of the profile line segments 192a through 192d of the to-be-added object 151. FIG. 17B is a diagram showing the positional information of the profile line segments 190a through 190d, 191a through 191d of the two laid-out objects 150.

According to the present embodiment, (1) a gradient, (2) a first end point, (3) a second end point, (4) a point of intersection with the X-axis, and (5) a point of intersection with the Y-axis are acquired and stored as the positional information. The "first end point" refers to one of the two end points that is closer to the origin O, and the "second end point" refers to one of the two end points that is farther from the origin O. The "point of intersection with the X-axis" refers to a point where the straight line that passes through the first end point and the second end point intersects with the X-axis, and the "point of intersection with the Y-axis" refers to a point where the straight line that passes through the first end point and the second end point intersects with the Y-axis.

In the examples shown in FIGS. 17A and 17B, the positional information is classified by gradient for the convenience of calculations to be described later. "INF" in FIGS. 17A and 17B represents a maximum value (infinite) that can be taken in the calculations.

In step S43, the interval adjuster 80 initializes an adjustment quantity "a" for the to-be-added object 151. The adjustment quantity "a" corresponds to a value by which the to-be-added object 151 is to be translated along the X-axis. Here, two unit lengths ("a"=−2) of the cells C is given as an initial value to the adjustment quantity "a".

In step S44, the interval adjuster 80 selects the profile line segment 192a, which has not yet been selected, from among the profile line segments 192a through 192d, which are adjustment targets. In order to distinguish the selected one from the other profile line segments 190a, etc., the selected profile line segment 192a will be referred to as a selected line segment 194. The selected line segment 194 has a first end point whose coordinates are represented by (xs1, ys1) and a second end point whose coordinates are represented by (xs2, ys2) (the coordinates satisfy the relationships: xs2≥xs1, ys2≥ys1). Each of the profile line segments 190a, etc. has a first end point whose coordinates are represented by (xf1, yf1) and a second end point whose coordinates are represented by (xf2, yf2) (the coordinates satisfy the relationships: xf2≥xf1, yf2≥yf1).

In step S45, the interval adjuster 80 evaluates an overlap between the selected line segment 194 selected in step S44 and the other profile line segments 190a, etc. The evaluation includes a judgment as to whether or not the selected line segment 194 and the other profile line segments 190a, etc. are in such a positional relationship that they at least partially overlap each other in a case where the selected line segment 194 is translated along the X-axis.

Firstly, the interval adjuster 80 extracts ones of the profile line segments 190a, etc. that have the same gradient (2.66666) as the selected line segment 194. As a result, the interval adjuster 80 extracts the four profile line segments 190a, 190c, 191a, 191c.

Secondly, the interval adjuster 80 judges whether the Y coordinates of the first end point and the second end point satisfy a predetermined magnitude relationship or not. Specifically, on the condition that the magnitude relationship (yf1>ys2) or (yf2>ys1) is satisfied, the interval adjuster 80 judges "N/A" (not overlapping), and otherwise, the interval adjuster 80 judges "OK" (overlapping).

FIG. 18 is a diagram showing evaluation results in step S45 shown in FIG. 15. FIG. 18 shows, in addition to the above positional information (FIGS. 17A and 17B), evaluation results including "DIFFERENCE" and "OVERLAP JUDGMENT". "DIFFERENCE" represents difference values between the point of intersection with X-axis of the selected line segment 194 and the points of intersection with X-axis of the other profile line segments 190a, etc., and "OVERLAP JUDGMENT" represents judgment results ("OK" or "N/A") of an overlap.

In step S46, the interval adjuster 80 updates the value of the adjustment quantity "a" in view of the judgment results in step S45, as necessary. Specifically, the interval adjuster 80 determines one "DIFFERENCE" whose absolute value is minimum, from among "DIFFERENCE" of the profile line segments 190a, etc. that have been judged "OK". On the condition that the absolute value of the determined "DIFFERENCE" is smaller than |"a"|, the interval adjuster 80 updates the adjustment quantity "a" to the value of the determined "DIFFERENCE". In FIG. 18, since the adjustment quantity "a"=−0.500 exists, the interval adjuster 80 updates the adjustment quantity "a" from "a"=−2 to "a"=−0.500.

In step S47, the interval adjuster 80 judges whether the evaluation of all of the profile line segments 192a through 192d, which are selection targets, has been finished or not. On the condition that the interval adjuster 80 judges that the evaluation of all of the profile line segments 192a through 192d has not been finished, control goes back to step S44, and steps S44 through S47 are repeated. On the condition that the interval adjuster 80 judges that the evaluation of all of the profile line segments 192a through 192d has been finished, control goes to next step S48.

Not all the profile line segments 192a through 192d may necessarily be used as selection targets, but some of them may be selected. In conjunction with or aside from this, not all the profile line segments 190a through 190d, 191a through 191d may necessarily be used as evaluation targets, but some of them may be selected as well. These alternatives are effective to reduce the amount of processing operation and shorten the processing time.

In step S48, the interval adjuster 80 determines the value of the last updated "a" ("a"=−0.500) as the adjustment quantity "a".

In step S49, the interval adjuster 80 translates the to-be-added object 151 by the adjustment quantity "a", thereby adjusting the interval between adjacent objects 46. More specifically, the interval adjuster 80 translates the profile line segments 192a through 192d by "0.5" in the negative direction along the X-axis (left in FIG. 16). In other words, the interval adjuster 80 adjusts the interval between the laid-out object 150 and the to-be-added object 151 by a unit ("0.5" in this case) smaller than the unit length "1" of the cells C.

Figure 19:
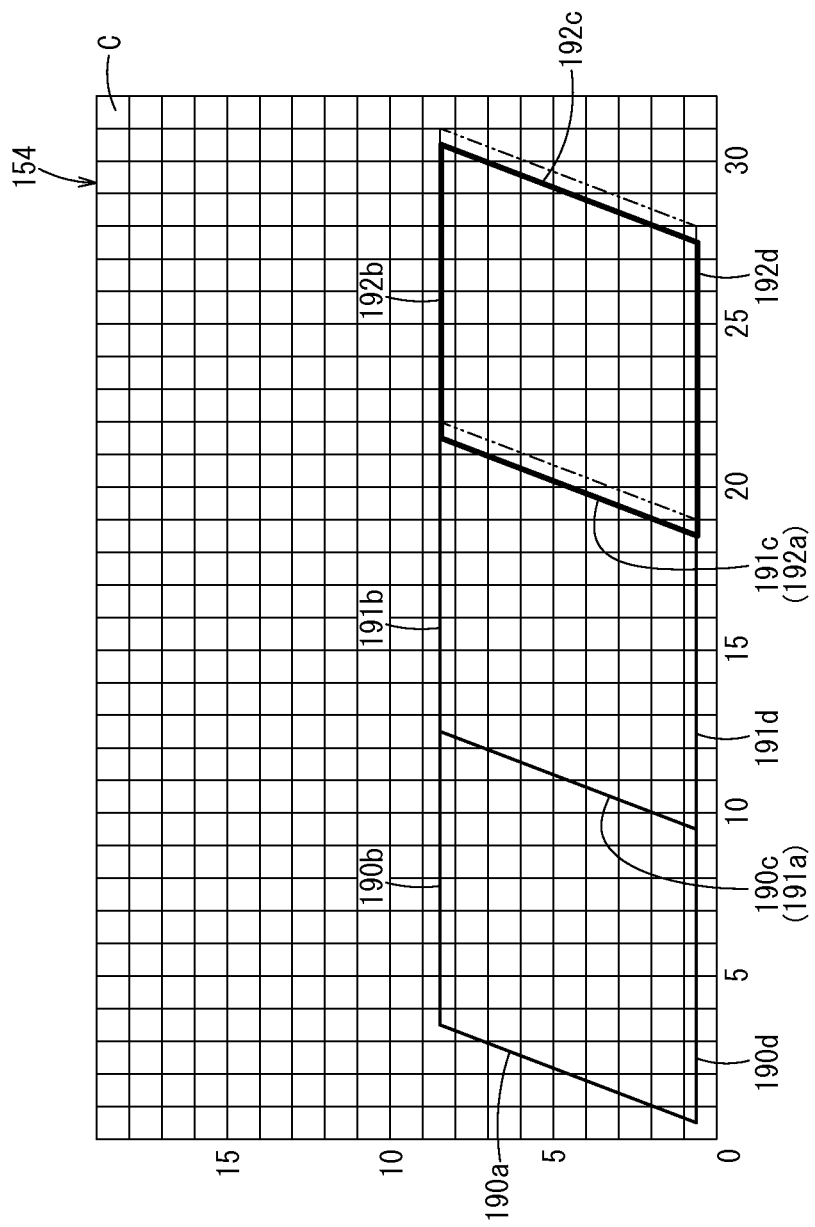
FIG. 19 is a view showing the to-be-added object shown in FIG. 16 that has been adjusted in layout.

As a consequence, as shown in FIG. 19, since the profile line segment 192a overlaps the profile line segment 191c, the profile lines 140 of the laid-out object 150 and the to-be-added object 151 partially agree with each other, i.e., the profile line segments 191c, 192a agree with each other.

As described above, the interval adjuster 80 may express the profile line 140 as a cluster of profile line segments 190a, etc. and adjust the interval between objects 46 such that profile line segments 191c, 192a whose gradients are equal to each other overlap each other at least partially. The present adjusting process can thus be easily applied to objects 46 which have a complex shape.

[Advantages of the Present Embodiment]

As described above, the imposing apparatus 20 (image editing apparatus) is an apparatus for ganging objects of one type in non-overlapping positions on the printing plate 28 or the print medium 38, the imposing apparatus 20 including the profile shape acquirer 72 for acquiring the profile line 140 (profile shape) of the objects 46, the layout condition setter 74 for setting the imposition area 142 on the printing plate 28 or the print medium 38, and the object placer 76 (including the layout searcher 78 and the interval adjuster 80) for laying out objects 46 in the imposition area 142 based on the profile line 140.

The layout searcher 78 searches for a layout of objects 46 whose profile lines 140 do not overlap each other with respect to each of cells C that make up the imposition area 142. Therefore, the amount of processing operation and the storage capacity of the memory required for the searching process are greatly reduced. In addition, the interval adjuster 80 adjusts the interval between the objects 46 that have been laid out according to the search result, by a unit smaller than the unit length of the cells C, thereby bringing the profile lines 140 of adjacent ones of the objects 46 into partial agreement with each other. Consequently, regardless of the settings of the unit length of the cells C, the profile lines 140 of adjacent ones of the objects 46 can partially be shared, and hence the objects 46 can easily be separated in a single cutting stroke. Objects 46 which may be of any shapes can therefore be ganged efficiently from the standpoints of a layout space, a processing time, and particularly the cutting process.

The present invention is not limited to the illustrated embodiment, but many changes and modifications can be made to the embodiment without departing from the scope of the present invention.

For example, according to the present embodiment, the imposition area 142 is divided into cells C that are square in shape and arranged as mesh openings. However, the cells C may be defined otherwise. For example, each of the cells C may be of any shape including a polygonal shape, such as a triangular shape, a quadrangular shape (rectangular shape), a hexagonal shape, etc., and one imposition area 142 may be composed of a mixture of cells having shapes or sizes of plural types.

What is claimed is:

1. An image editing apparatus for ganging objects of one type in non-overlapping positions on a printing plate or a print medium, comprising:
   a profile shape acquirer for acquiring a profile shape of the objects;
   a layout condition setter for setting an imposition area on the printing plate or the print medium; and
   an object placer for laying out the objects in the imposition area set by the layout condition setter, based on the profile shape acquired by the profile shape acquirer;
   wherein the object placer comprises:
   a layout searcher for searching for a layout of the objects whose profile shapes do not overlap each other with respect to each of cells that make up the imposition area; and
   an interval adjuster for adjusting an interval between the objects that have been laid out according to a search result from the layout searcher, by a unit smaller than a unit length of the cells, thereby bringing profile lines of adjacent ones of the objects into partial agreement with each other,
   wherein the interval adjuster expresses each of the profile shapes as a cluster of profile line segments, and adjusts the interval between the objects such that ones of the profile line segments that have the same gradient overlap each other at least partially.

2. The image editing apparatus according to claim 1, wherein the object placer further comprises:
   a cluster generator for generating an object cluster made up of two or more of the objects laid out along an arraying direction;
   wherein the layout searcher regards the object cluster generated by the cluster generator as one set and searches for a layout of the object clusters such that the profile shapes do not overlap each other; and
   the interval adjuster adjusts the interval between the object clusters that have been laid out according to a search result from the layout searcher, thereby bringing the profile lines of adjacent ones of the objects into partial agreement with each other.

3. The image editing apparatus according to claim 1, wherein the layout searcher expresses presence or absence of the objects by Boolean values with respect to the respective cells, and searches for a layout of the objects while judging an overlap between the objects using a binary image represented by the Boolean values.

4. The image editing apparatus according to claim 1, wherein the object placer variably sets a size of the cells in response to a predetermined input action.

5. An image editing method of ganging objects of one type in non-overlapping positions on a printing plate or a print medium, the image editing method enabling a computer to perform the steps of:
   acquiring a profile shape of the objects;
   setting an imposition area on the printing plate or the print medium; and
   laying out the objects in the set imposition area based on the acquired profile shape;
   wherein the step of laying out the objects comprises the steps of:
   searching for a layout of the objects whose profile shapes do not overlap each other with respect to each of cells that make up the imposition area; and
   adjusting an interval between the objects that have been laid out according to a search result, by a unit smaller than a unit length of the cells, thereby bringing profile lines of adjacent ones of the objects into partial agreement with each other,
   wherein in the adjusting, each of the profile shapes is expressed as a cluster of profile line segments, and the interval between the objects is adjusted such that ones of the profile line segments that have the same gradient overlap each other at least partially.

6. A non-transitory storage medium storing an image editing program for ganging objects of one type in non-overlapping positions on a printing plate or a print medium, the image editing program enabling a computer to perform the steps of:

acquiring a profile shape of the objects;
setting an imposition area on the printing plate or the print medium; and
laying out the objects in the set imposition area based on the acquired profile shape;
wherein the step of laying out the objects comprises the steps of:
searching for a layout of the objects whose profile shapes do not overlap each other with respect to each of cells that make up the imposition area; and
adjusting an interval between the objects that have been laid out according to a search result, by a unit smaller than a unit length of the cells, thereby bringing profile lines of adjacent ones of the objects into partial agreement with each other,
wherein in the adjusting, each of the profile shapes is expressed as a cluster of profile line segments, and the interval between the objects is adjusted such that ones of the profile line segments that have the same gradient overlap each other at least partially.

* * * * *